(12) United States Patent
Chang et al.

(10) Patent No.: US 7,966,896 B2
(45) Date of Patent: Jun. 28, 2011

(54) FIXTURE FOR TORQUE METER AND APPARATUS HAVING THE FIXTURE FOR TESTING TORQUE

(75) Inventors: Wei-Yao Chang, Tu-Cheng (TW); Chuan-De Huang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 170 days.

(21) Appl. No.: 12/464,113

(22) Filed: May 12, 2009

(65) Prior Publication Data

US 2009/0277282 A1 Nov. 12, 2009

(30) Foreign Application Priority Data

May 12, 2008 (CN) .......................... 2008 1 0301536

(51) Int. Cl.
*G01L 3/00* (2006.01)
(52) U.S. Cl. ....................................... 73/862.08; 73/760

(58) Field of Classification Search .................. 73/862.08–862.194, 760–860
See application file for complete search history.

(56) References Cited

U.S. PATENT DOCUMENTS

| | | | |
|---|---|---|---|
| 3,906,747 A * | 9/1975 | Orain | 464/111 |
| 4,747,200 A * | 5/1988 | Olson, II | 29/423 |
| 6,425,605 B1 * | 7/2002 | Cholakon et al. | 280/775 |
| 6,826,791 B2 * | 12/2004 | Fromme | 5/247 |

* cited by examiner

*Primary Examiner* — Max Noori
(74) *Attorney, Agent, or Firm* — Raymond J. Chew

(57) ABSTRACT

A fixture for a torque meter includes a bearing having a cylindrical stator and a rotor, two or more arms, and two or more elastic members. The cylindrical stator defines a through hole therein. The rotor is rotatably received in the through hole and is configured for holding the torque meter. The at least two arms are respectively connected to two opposite sides of the cylindrical stator. Each of the elastic members elastically supporting a corresponding arm, a compression direction and a rebound direction of the elastic members are parallel to a rotation axis of the rotor.

19 Claims, 6 Drawing Sheets

FIXTURE FOR TORQUE METER AND APPARATUS HAVING THE FIXTURE FOR TESTING TORQUE

BACKGROUND

1. Technical Field

The present invention relates generally to apparatuses for testing torque of assemblies such as lens modules; and particularly to a fixture for fixing a torque meter, and an apparatus having the fixture and a torque meter for testing torque.

2. Discussion of Related Art

With the ongoing development of optical imaging technology, lens modules are now widely used in a variety of electronic devices, such as digital cameras and mobile phones.

A lens module generally includes a barrel holder, a barrel threadedly engaged with the barrel holder, and a number of optical members (i.e., optical lenses, filters, and spacers) received in the barrel. During assembling of the lens module, the optical members are firstly disposed in the barrel, and then the barrel is screwed into the barrel holder. To screw the barrel, a torque must be applied to the barrel. Once the screwing process is completed, the barrel is held in its final position by friction between the barrel and the barrel holder. However, friction (rubbing) occurring between the barrel and the barrel holder during the screwing process may cause either or both of the barrel and the barrel holder to deform.

To ensure that the performance of a lens module satisfies its design requirements, the amount of friction must be limited within a predetermined range. When the amount of friction is limited within the predetermined range, any deformation of the barrel and the barrel holder is considered to correspondingly be within acceptable limits. Thus after the screwing process, the friction between the barrel and the barrel holder should be tested using a torque meter. The torque meter shows how much force must be applied to displace the barrel from its final position and completely unscrew the barrel from the barrel holder. Thereby, the torque meter shows the amount of friction between the barrel and the barrel holder. This testing process is generally called torque testing.

During typical torque testing of the lens module, firstly, a platform is provided for supporting and fixing the barrel holder of the lens module; secondly, a fixing end of the torque meter is fixed on the barrel; thirdly, a testing end of the torque meter is rotated until the barrel is unscrewed out of the barrel holder. A maximum torque recorded by the torque meter is the maximum amount of friction between the barrel and the barrel holder.

However, nowadays, many lens modules are becoming smaller and smaller in size with each new product release. It is difficult to fix a torque meter on a small-sized lens module. Additionally, it is difficult to ensure that a central axis of the torque meter and an optical axis of the lens module coincide with each other throughout the torque testing process. As such, the torque meter may provide imprecise testing results.

Therefore, what is needed is to provide an apparatus or means which is capable of overcoming the aforementioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. In the drawings, all the views are schematic.

DETAILED DESCRIPTION OF EMBODIMENTS

Various embodiments of a fixture for fixing a torque meter and an apparatus for testing torque will be described in detail with reference to the accompanying drawings.

Figure 1:
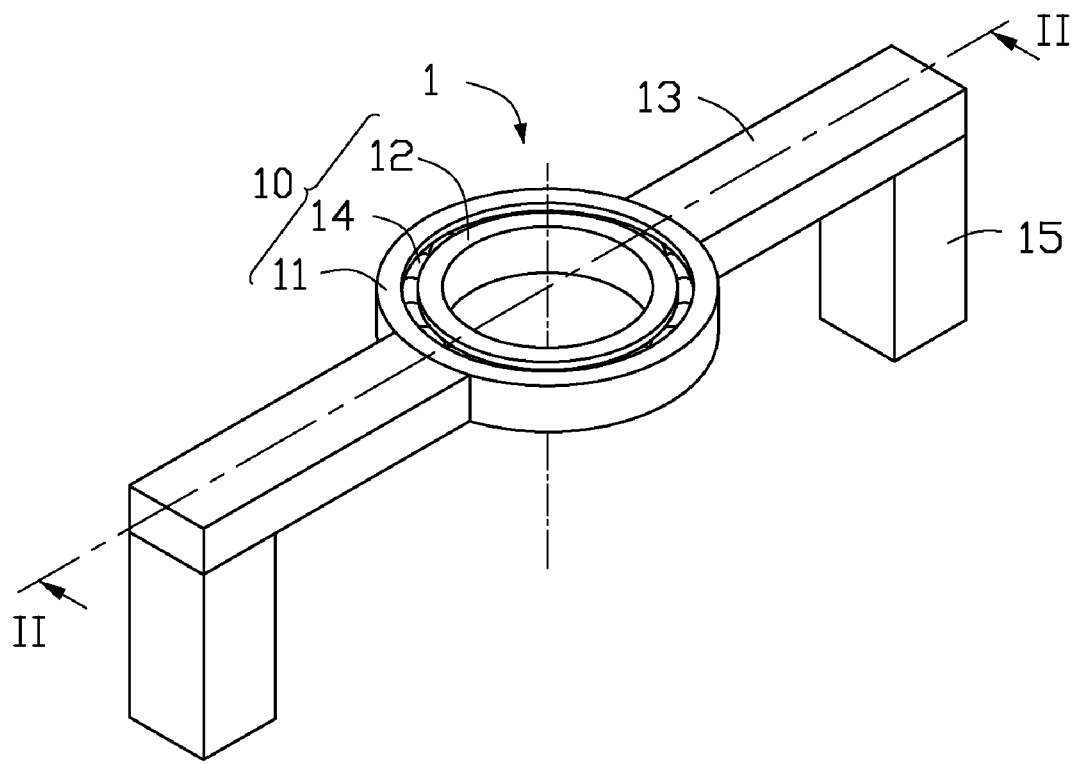
FIG. 1 is an isometric view of a fixture for fixing a torque meter in accordance with a first embodiment.
Figure 2:
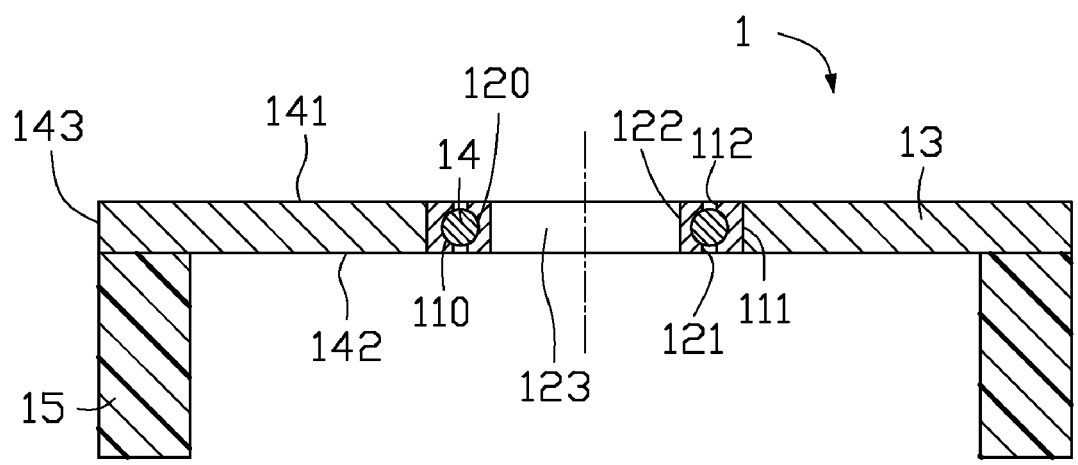
FIG. 2 is a cross-sectional view of FIG. 1 taken along line II-II thereof.

Referring to FIGS. 1 and 2, a fixture 1 for fixing a torque meter in accordance with a first embodiment includes a bearing 10, two arms 13, and two elastic members 15.

The bearing 10 includes a cylindrical stator 11, a rotor 12, and a number of ball bearings 14. The cylindrical stator 11 has an outer cylindrical surface 111 and an inner cylindrical surface 112. A first annular groove 110 is defined in the inner cylindrical surface 112. The first annular groove 110 defines an arc-shaped transverse cross-section, and is configured for partially receiving each of the ball bearings 14. In the present embodiment, the ball bearings 14 are steel balls.

The rotor 12 is ring shaped, and has an outer sidewall 121 and an inner sidewall 122. The inner sidewall 122 defines a cylindrical mounting hole 123 for mounting of a torque meter therein. A second annular groove 120 is defined in the outer sidewall 121. The second annular groove 120 defines an arc-shaped transverse cross-section. The first and second annular grooves 110, 120 are oriented opposite to each other, and cooperatively define an annular passage for movably receiving the steel balls 14. In addition, to ensure there is no resistance between the rotor 12 and the cylindrical stator 11 when the rotor 12 rotates within the cylindrical stator 11, the rotor 12 and the cylindrical stator 11 are spaced apart from each other by the steel balls 14. To enable such spacing apart, a depth of each of the first and second annular grooves 110, 120 is less than one half of the diameter of the steel balls 14. In the present embodiment, the depth of each of the first and second annular grooves 110, 120 is approximately equal to one third of the diameter of the steel balls 14. As such, the distance between the cylindrical stator 11 and the rotor 12 is about one third of the diameter of the steel balls 14. However, it is to be understood that the arc-shaped first and second annular grooves 110, 120 and steel balls 14 can be replaced with other suitable grooves and/or rolling members, such as rollers disposed in parallel.

Two arms 13 are respectively arranged at opposite sides of the cylindrical stator 11. In the present embodiment, the first and second arms 13 are directly connected to the cylindrical surface 111 of the cylindrical stator 11, and are aligned with each other. The two arms 13 each have a rectangular cross-section. Each of the two arms 13 has a top first surface 141 and a bottom second surface 142 at opposite sides thereof, and an outer end third surface 143 adjoining the first and second surfaces 141, 142. Both the first and the second surfaces 141, 142 are perpendicular to a rotation axis of the rotor 12, and the third surface 143 is parallel to the rotation axis of the rotor 12.

Each of the elastic members 15 elastically supports a corresponding arm 13. A compression direction and a rebounding direction of the elastic members 15 is parallel to the rotation axis of the rotor 12. Examples of the elastic members 15 include springs (e.g., helical springs, torsion bar springs, and rubber springs), and elastic blocks made of elastic material (e.g., rubber blocks, polyurethane resin blocks, epoxy resin blocks, polyvinyl alcohol blocks, and polyimide blocks). In the present embodiment, the elastic members 15 are rectangular rubber blocks. The elastic members 15 are disposed at the second surfaces 142 of the arms 13. Alternatively, the elastic members 15 can be disposed at the third surfaces 143 of the arms 13. To improve frictional force between the elastic members 15 and a platform (not shown) used to support the fixture 1, a bottom surface of each of the elastic members 15 can be a rough surface.

Figure 3:
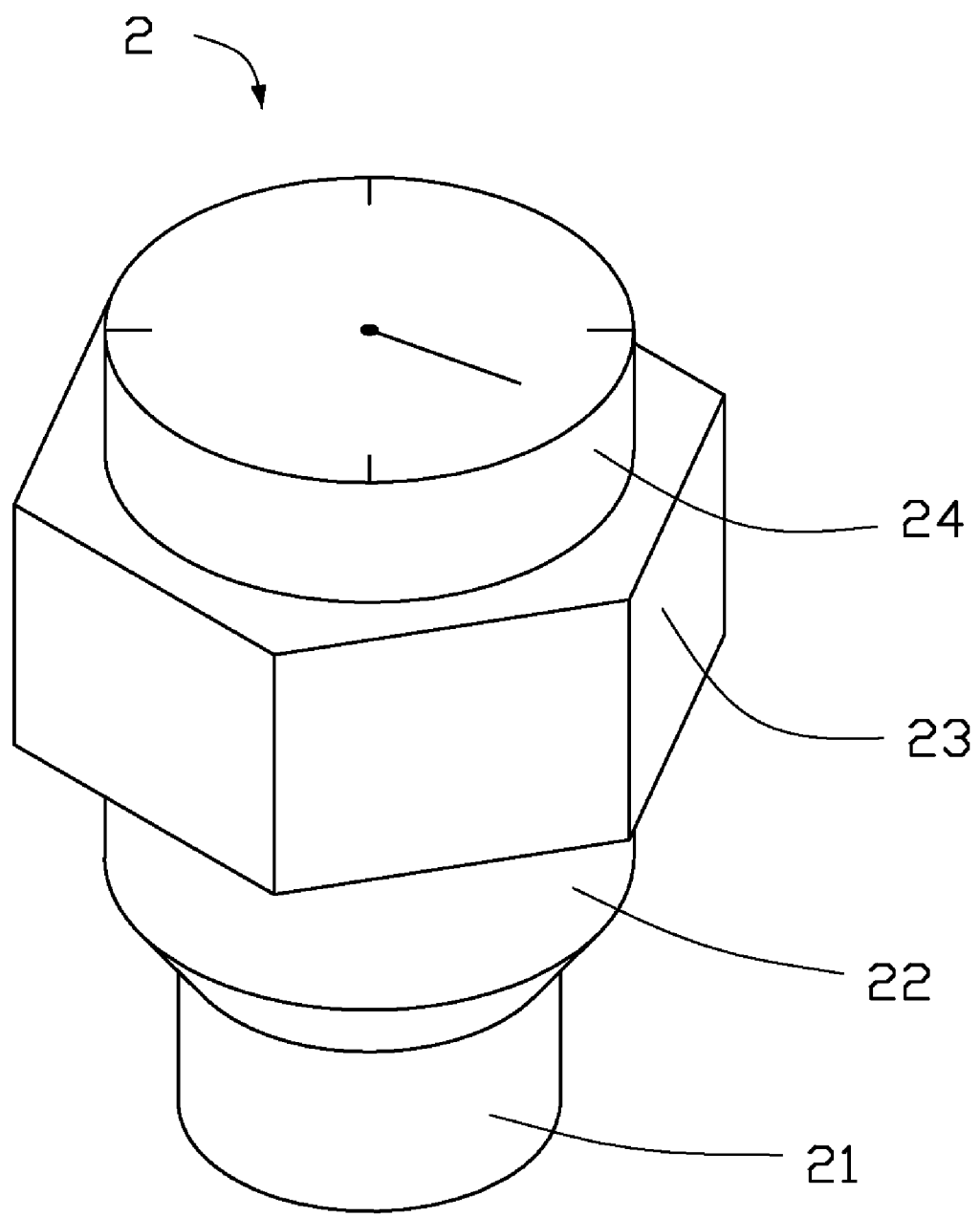
FIG. 3 is an isometric view of a torque meter.

Referring also to FIG. 3, the fixture 1 is configured for holding a torque meter 2 to achieve precise torque testing of lens modules. In the present embodiment, the torque meter 2 is a hand-held type torque meter, and includes a clamping portion (clamping member) 21 for clamping an assembly (or workpiece) to be tested (e.g., a barrel of a lens module), a main body 22, a handle portion 23, and a display portion 24. The main body 22 is disposed between the clamping portion 21 and the handle portion 23, and is capable of rotating together with the clamping portion 21. The handle portion 23 is between the main body 22 and the display portion 24. An operator can rotate the clamping portion 21 and the workpiece by driving the handle portion 23. The display portion 24 can display the testing results.

Figure 4:
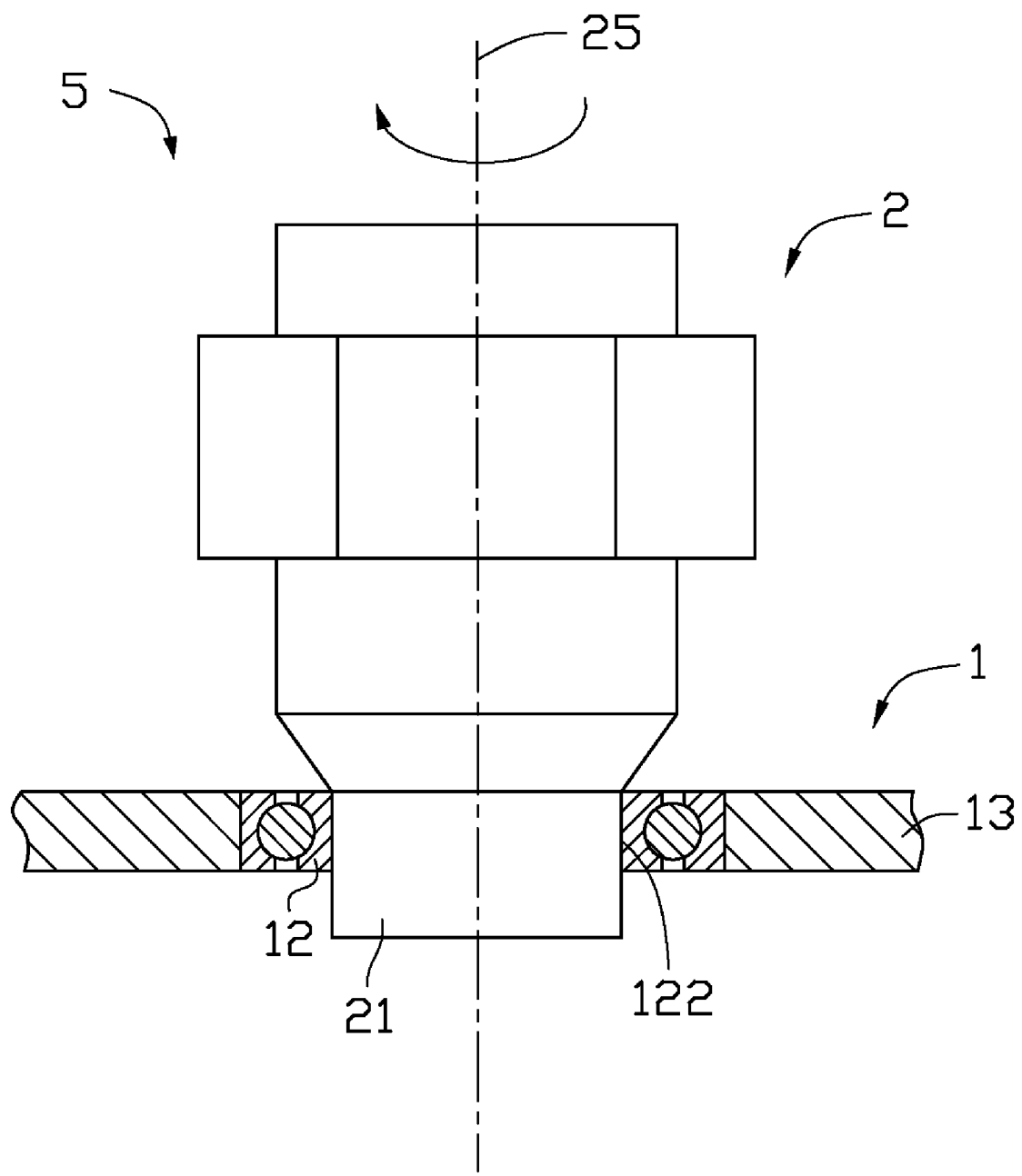
FIG. 4 is a side plan, cutaway view of part of an apparatus for testing torque, the apparatus including the fixture of FIG. 1 and the torque meter of FIG. 3.

Referring also to FIG. 4, an apparatus 5 for testing torque includes the fixture 1 and the torque meter 2. The clamping portion 21 is fixed to the rotor 12 of the fixture 1. In the present embodiment, the clamping portion 21 is in interference fit with the inner sidewall 122 such that the clamping portion is capable of rotating together with the rotor 12. The torque meter 2 has a central axis 25 that is perpendicular to the arms 13 and parallel with the inner sidewall 122. When the torque meter 2 is rotated within the bearing 10, the torque meter 2 is prevented from tilting due to the limiting effect of the bearing 10. Thus the central axis 25 of the torque meter 2 can reliably remain in the same position relative to the lens module at all times. As such, it is relatively easy to ensure that the central axis 25 of the torque meter 2 and an optical axis of a lens module coincide with each other throughout a torque testing process.

Figure 5:
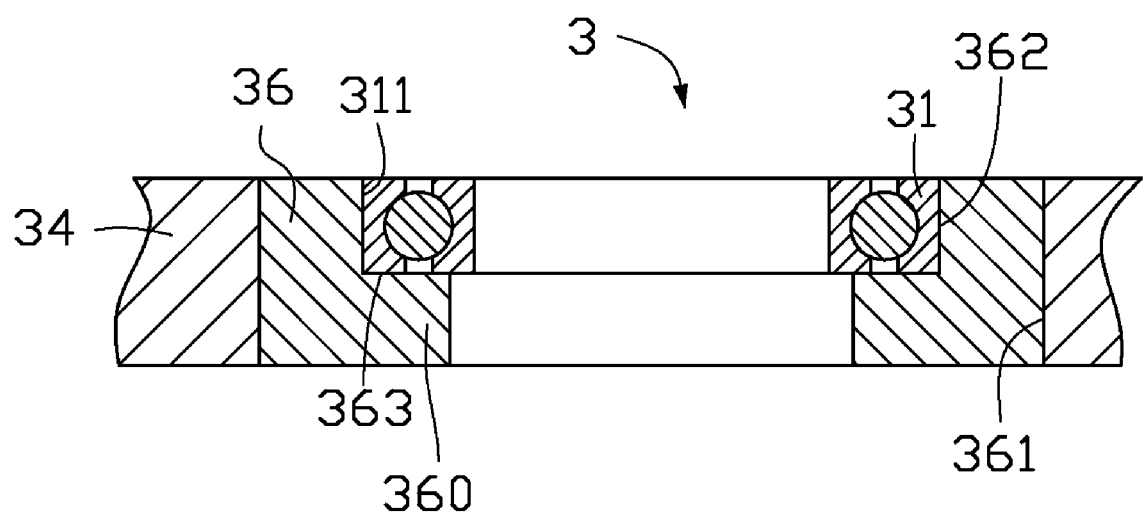
FIG. 5 is a cross-sectional view of part of a fixture for fixing a torque meter in accordance with a second embodiment.

Referring to FIG. 5, a fixture 3 for holding a torque meter in accordance with a second embodiment is similar to the fixture 1. However, the fixture 3 further includes an annular supporting ring 36 for supporting a cylindrical stator 31.

The supporting ring 36 has an outer sidewall 361 and an inner sidewall 362. An annular protrusion 360 extends from the inner sidewall 362 in a direction toward a central axis of the supporting ring 36. The protrusion 360 has a supporting surface 363 that is perpendicular to the inner sidewall 362. The cylindrical stator 31 is disposed on the supporting surface 363. An outer sidewall 311 of the cylindrical stator 31 is in interference fit with the inner sidewall 362 of the supporting ring 36. Alternatively, the cylindrical stator 31 can be fixed to the supporting ring 36 by screws or other fasteners. Two arms 34 are symmetrically connected to opposite sides of the outer sidewall 361 of the supporting ring 36. The supporting ring 36 can further improve a stability of the cylindrical stator 31.

Figure 6:
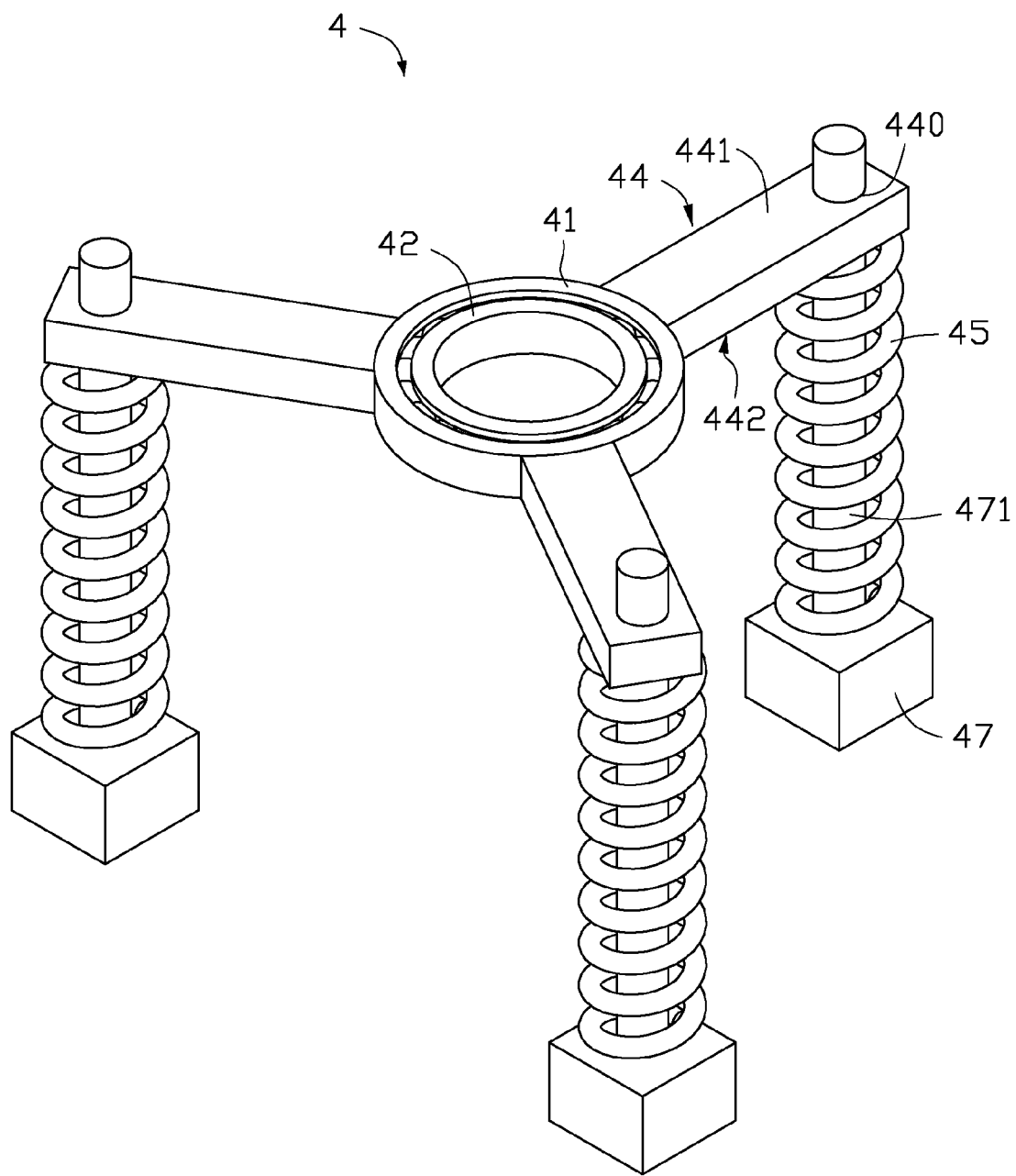
FIG. 6 is an isometric view of a fixture for fixing a torque meter in accordance with a third embodiment.

Referring to FIG. 6, a fixture 4 for holding a torque meter in accordance with a third embodiment is similar to the fixture 1. However, the fixture 4 includes three arms 44 and three base members 47. The three arms 44 are equally angularly spaced from one another around the cylindrical stator 41. That is, an angle between each two adjacent arms 44 is 120°. Each of the three arms 44 includes an upper surface 441 and a lower surface 442 at opposite sides thereof. Each arm 44 has a guide hole 440 in an end thereof that is far away from the cylindrical stator 41. The guide hole 440 spans from the upper surface 441 to the lower surface 442. A central axis of the guide hole 440 is parallel to a central axis of the rotor 42.

Each of the base members 47 includes a guide rod 471 extending toward said end of a corresponding arm 44. An elastic member 45 is positioned around the guide rod 471. In the present embodiment, the elastic member 45 is a helical spring (coil spring). A top end of the guide rod 471 passes through the through hole 440. As such, the elastic member 45 elastically supports the corresponding arm 44. To improve stability, the three base members 47 can be connected together with connecting rods (not shown). In alternative embodiments, the fixture 4 can include more than three arms 44.

The aforementioned fixtures 1, 3, 4 have at least the following advantages. First, each of the fixtures 1, 3, 4 can stably hold the torque meter 2. Thus, it is easier to keep the central axis of the clamping portion 21 of the torque meter 2 in alignment with the optical axis of a lens module under test when the clamping portion 21 is driven to rotate. In addition, the elastic members 15, 45 of the fixtures 1, 3, 4 can automatically support the torque meter 2 at the required height. As such, it is not necessary to adjust the height of the torque meter 2 during the torque testing process. In summary, the fixtures 1, 3, 4 can help to achieve high precision torque testing.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A fixture for a torque meter, the fixture comprising:
a bearing comprising a cylindrical stator, and a rotor defining a through hole therein configured for holding the torque meter;
at least two arms equally angularly spaced from one another around the cylindrical stator and fixed relative to the cylindrical stator;
a plurality of rolling members disposed between the cylindrical stator and the rotor; and
at least two elastic members, each of the elastic members elastically supporting a corresponding arm, a compression direction and a rebounding direction of the elastic members being parallel to a rotation axis of the rotor.

2. The fixture of claim 1, wherein the rotation axis of the rotor is the same as a central axis of the cylindrical stator.

3. The fixture of claim 1, wherein the rotor and the cylindrical stator are spaced apart from each other by the rolling members.

4. The fixture of claim 1, wherein the rolling members are ball bearings, the cylindrical stator comprising an inner cylindrical surface, a first annular groove being defined in the inner cylindrical surface, the rotor comprising an outer sidewall, a second annular groove being defined in the outer sidewall, the first and second annular grooves cooperatively defining a passage, and the ball bearings being movably received in the passage.

5. The fixture of claim 4, wherein a depth of at least one of the first and second grooves is less than one half of a diameter of the ball bearings.

6. The fixture of claim 1, further comprising a supporting ring positioned around and holding the cylindrical stator, the at least two arms being fixed to the supporting ring.

7. The fixture of claim 1, wherein the elastic members are selected form the group consisting of flexible resin blocks and springs.

8. The fixture of claim 1, wherein each of the arms defines a through hole in an end thereof, a central axis of the through hole is parallel to the rotation axis of the rotor, the fixture further comprises at least two base members, each of the base members includes a guide rod, each of the springs is coiled around a corresponding guide rod, and an end of the guide rod is received in the through hole of a corresponding arm.

9. An apparatus for testing torque, comprising:
   a torque meter comprising a clamping portion configured for clamping an assembly to be tested; and
   a fixture for holding the torque meter, the fixture comprising:
   a bearing comprising a cylindrical stator, and a rotor defining a through hole therein;
   at least two arms respectively fixed to two opposite sides of the cylindrical stator; and
   at least two elastic members, each of the elastic members elastically supporting a corresponding arm, a compression direction and a rebounding direction of elastic members being parallel to a rotation axis of the rotor;
   wherein the clamping portion of the torque meter is fixed relative to the rotor.

10. The apparatus of claim 9, wherein the rotation axis of the rotor is the same to a central axis of the cylindrical stator.

11. The apparatus of claim 9, further comprising a number of rolling members disposed between the cylindrical stator and the rotor.

12. The apparatus of claim 11, wherein the rotor and the cylindrical stator are spaced apart from each other by the rolling members.

13. The apparatus of claim 11, wherein the rolling members are rolling balls, the cylindrical stator having an inner cylindrical surface, a first annular groove being defined in the inner cylindrical surface, the rotor having an outer sidewall, a second annular groove being defined in the outer sidewall, the first and second annular grooves cooperatively defining a passage and the rolling balls being received in the passage.

14. The apparatus of claim 13, wherein depth of the first and second grooves is less than one second of a diameter of the rolling balls.

15. The apparatus of claim 9, further comprising a supporting ring placed around the cylindrical stator, the at least two arms respectively connected to opposite sides of the supporting ring.

16. The apparatus of claim 9, wherein the rotor comprising an inner sidewall defining a mounting hole, the clamping is in interference fit with the mounting hole.

17. The apparatus of claim 9, wherein the elastic members are springs.

18. The apparatus of claim 17, wherein a through hole is defined in an end of each of the arms, a central axis of the through hole is parallel to a rotation axis of the rotor, the fixture further comprising at least two base members, each of the base members having a guide rod, each of the elastic members is coiled around the guide rod, and an end of the guide rod passing through the through hole.

19. The apparatus of claim 9, wherein the clamping portion is fixed in the through hole.

\* \* \* \* \*